United States Patent [19]

Walker

[11] 4,311,332
[45] Jan. 19, 1982

[54] SHELLFISH RAKE CONSTRUCTION

[76] Inventor: Norman A. Walker, 16 Buxton Ave., Somerset, Mass. 02727

[21] Appl. No.: 208,225

[22] Filed: Nov. 19, 1980

[51] Int. Cl.³ .............................................. A01D 1/14
[52] U.S. Cl. .................................... 294/50.9; 294/55; 294/111
[58] Field of Search ................... 294/50.9, 50.6, 50.7, 294/50.8, 55, 111, 103, 19 R

[56] References Cited

U.S. PATENT DOCUMENTS

| | | | |
|---|---|---|---|
| 105,495 | 7/1870 | Sands | 294/111 |
| 391,078 | 10/1888 | Rieohen | 294/50.9 |
| 1,141,423 | 6/1915 | Simas | 294/55 |
| 1,283,080 | 10/1918 | Coe | 294/111 |

Primary Examiner—James B. Marbert
Attorney, Agent, or Firm—Robert J. Doherty

[57] ABSTRACT

A shellfish rake in which a plurality of tines are laterally spaced from each other so as to form a basket having a generally open front face adapted to be closed by a spring actuated cover. The rear wall of the basket includes a guide adapted to receive an elongated pole which serves to actuate; that is, to dredge, the basket across the floor or shellfish bed of the ocean, river, etc. A line is attached to the basket such that the basket may be brought to the surface of the water while using the elongated pole as a guide rather than lifting the pole and attached basket as is conventionally done. An additional feature of the invention includes a frame supported by the boat of the user which includes a pivotally attached upright member in turn adapted to fixedly engage the pole such that back and forth pivotal movement of such member actuates the pole and thus drags the basket across the surface of the bed in a more efficient manner. An ever further feature of the invention is the provision of a multi-piece pole construction which pieces may be internally interlocked together so as to avoid external joints which could undesirably interfere with the free sliding action of the basket therealong as when the basket is being moved to the surface.

10 Claims, 10 Drawing Figures

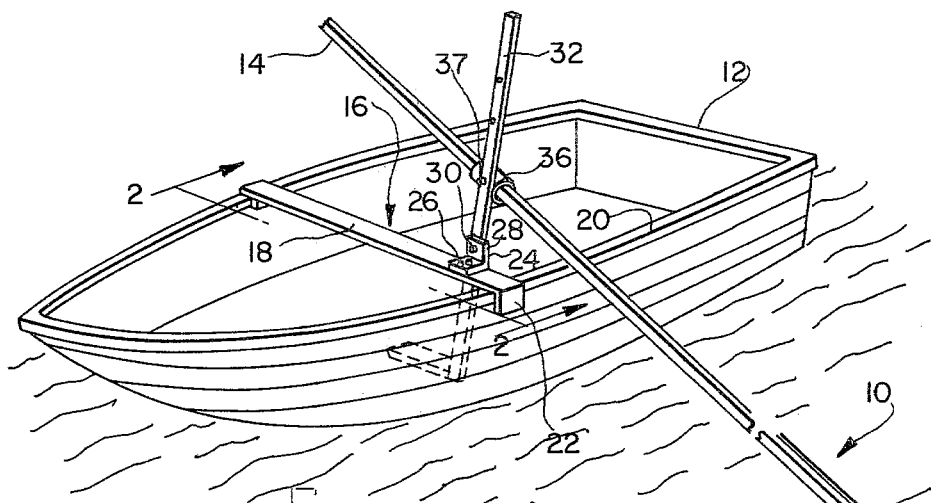
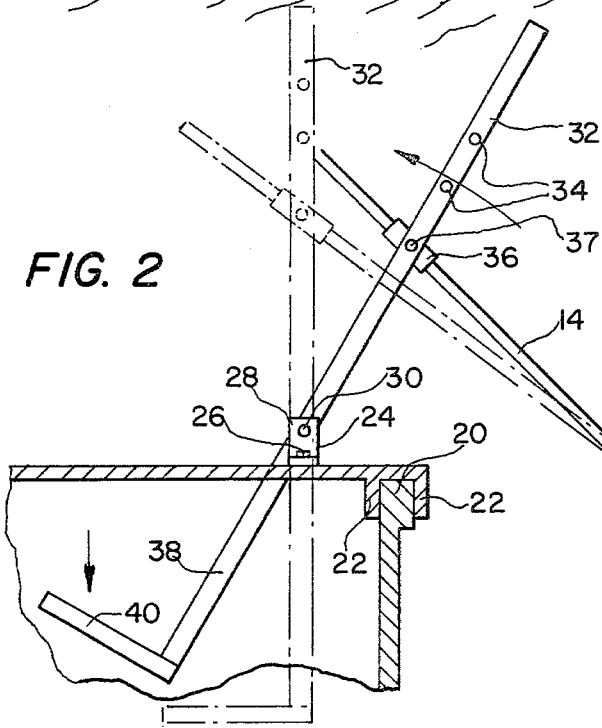
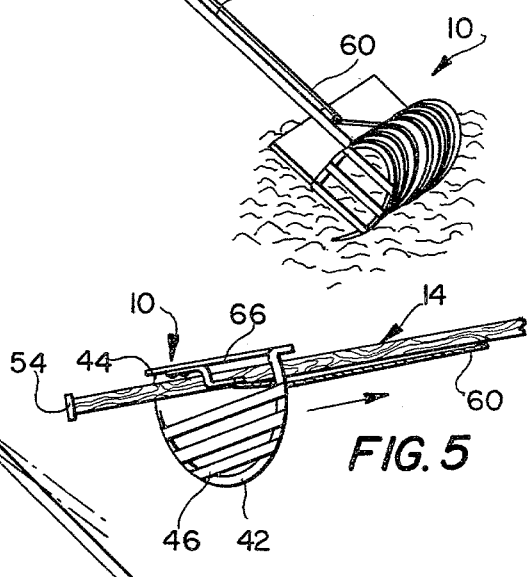
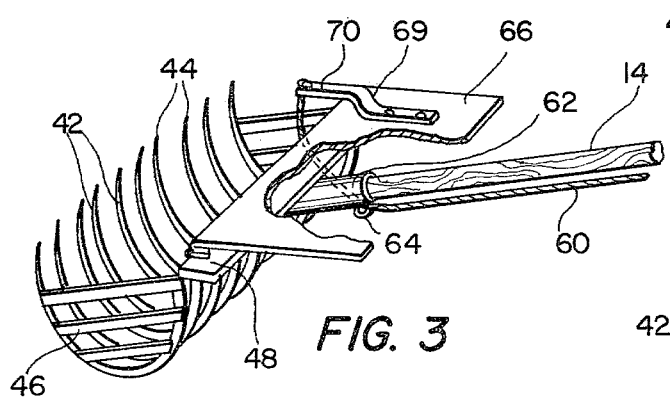
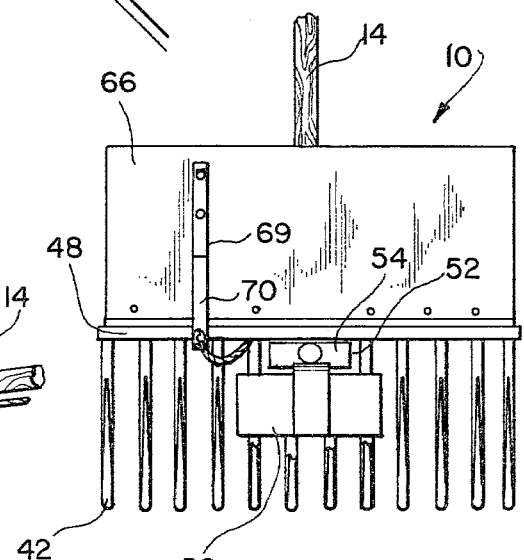
FIG. 1
FIG. 2
FIG. 3
FIG. 4
FIG. 5

SHELLFISH RAKE CONSTRUCTION

BACKGROUND AND SUMMARY OF THE INVENTION

This invention relates to a rake construction particularly adapted for use in dredging for shellfish such as clams and the like. Normally such activity is carried out with the use of what is normally termed a "bull rake"; that is, a basket-like apparatus having an elongated pole fixedly attached thereto at one end. The pole and thus the basket is disposed on the ocean bed at an angular disposition by an operator generally standing in a boat offset from the position of the basket. The dredging action is brought about by dragging the pole towards the operator. After several such dragging strokes the basket is lifted to the surface by the operator grasping the pole in a hand over hand action. This is a strenuous and tiring activity on the operator; and, accordingly, it would be desirable if the same activity could be accomplished in a less physically demanding manner.

Another attendant disadvantage of present equipment utilized for obtaining shellfish in the above-described manner is that while drawing the basket to the surface it is often possible to inadvertently twist the elongated pole to such an extent that the normally open face of the basket is disposed downwardly into the water such that the clams or other shellfish held by the basket are accidentally discharged. It is, however, sometimes desirable to be able to purposely invert the basket so as to dislodge the contents thereof as when the basket has been observed to contain only mud, rocks or the like.

It is accordingly an object of the present invention to provide a device which accomplishes the above-indicated desirable features in a relatively straightforward and inexpensive manner.

These and other objects of the invention are accomplished by the provision of an improved shellfish rake construction comprising a basket in part formed from a plurality of laterally spaced generally U-shaped tines defining a rear heel and a normally open face to said basket, forward portions of said tines adapted to contact the bed of the ocean or other body of water in operating position, a plate extending laterally across the rear of said basket so as to interconnect rear portions of said tines, guide means disposed at the rear of said basket for slidably receiving an elongated handle adapted to extend through the surface of said body of water, said handle terminating at its lower end in a stop adapted to engage said basket guide means such that upward movement on said handle will drag said basket along said bed, and a line attached to said basket and adapted to extend along said handle such that said basket may be slidably drawn to the water surface along said handle.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention;

FIG. 1 is a perspective view showing the device of the present invention in its operational environment; that is, supported by a row boat or the like;

FIG. 2 is a partial sectional view taken along the line 2—2 of FIG. 1 and shows in particular the operation of the frame by which the elongated pole may be more easily activated;

FIG. 3 is a perspective view of the basket portion of the rake;

FIG. 4 is a front elevational view thereof;

FIG. 5 is a somewhat schematic view showing the manner in which the basket may be drawn to the surface while using the pole as a guide;

DESCRIPTION OF THE INVENTION

Figure 6:
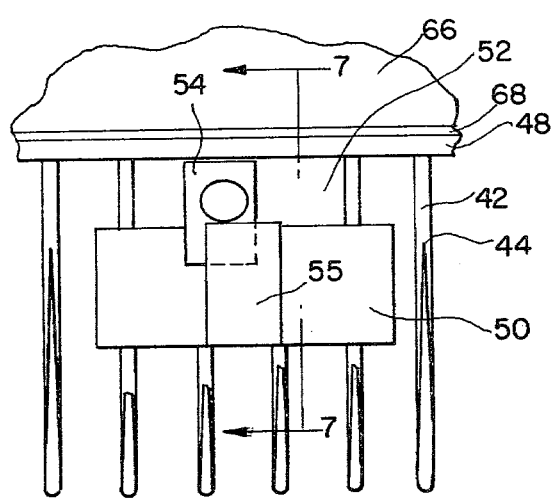
FIG. 6 is an enlarged view of a portion of the basket construction and illustrates the manner in which the pole is used to both push and pull the basket.
Figure 7:
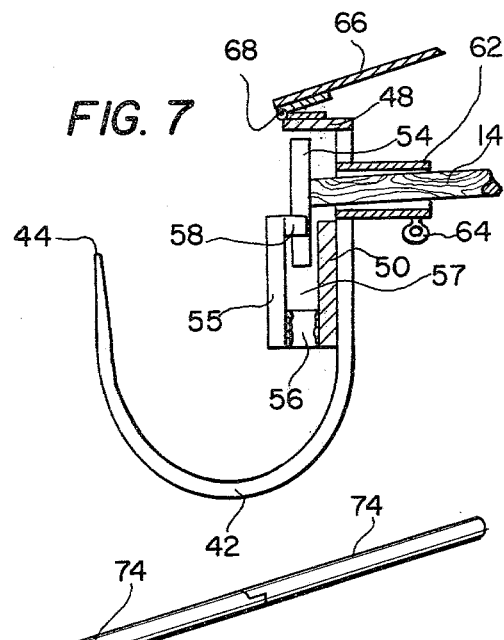
FIG. 7 is a sectional view of the basket taken along the line 7—7 of FIG. 6.

Turning now to the drawing and particularly FIG. 1 thereof, the overall environment in which the present invention is utilized is depicted. Therein, a rake 10 is shown supported by a small boat 12 by means of an elongated handle or pole 14. The rake 10 is positioned on the bottom of the ocean, river or the like at a position of a known shellfish bed and at an angular disposition with regard to the boat such that pulling of the basket towards the boat as by pulling on the elongated handle 14 causes the basket to move across and cut into the bed.

In order to reduce the effort required to move the basket in the aforementioned raking motion, the boat is provided with a frame 16 including a cross-support 18 adapted to extend across the width of the boat and be supported by the gunnels 20 thereof. In order to better conform to the gunnels 20, a pair of spaced cleats 22 downwardly extend at the opposite ends of the support 18 in a U-shaped configuration adapted to receive the gunnels 20. Also, if necessary and not illustrated, bars may extend from the inner cleats 22 downwardly to the central rib of the boat in order to provide additional support.

The support 18 is provided with a generally L-shaped plate 24 positioned off center adjacent the near side gunnel 20 and secured to the support by means of bolts 26. The upwardly extending leg 28 of the plate 24 includes a pin 30 extending therethrough and through an opening (not shown) in an upright member 32. The upright member 32 is thus pivotally attached to the support 18. Such upright member 32 further includes one pole rest or support positions 34 positioned longitudinally therealong at spaced intervals thereof so as to support a sleeve clamp 36 in turn adapted to receive the upper end of the pole 14. The rests 34 may take any desirable form so long as they serve to temporarily fix the position of the pole with regard to the upright member 32. The form shown, however, is that of a pin 37 adapted to extend through an opening in the upright member 32 and through the sleeve 36 such that threadable rotation of the pin 37 into the sleeve serves to fix the position of the pole as desired in the manner of a set screw. The pin is provided with an enlarged head so as to prevent it from moving through the opening provided in the upright member 32. Such clamp arrangement is illustrative only and any other equivalent clamps may be utilized so long as they provide the above-described end result.

The upright member 32 includes a lower extension 38 which terminates in a foot engageable platform or treadle 40. Thus it may be seen and as best shown in FIG. 2 that movement of the upright member 32 arcuately in the direction of the arrow above the pivot pin 30 serves to move the handle 14 from the full line position to the dotted line position. This results in the desired dragging motion being imparted to the basket 10 without the necessity of both supporting and dragging the pole 14 in one's arms as is now conventionally done. In addition, by either grasping the top of the upright member 32 and pulling it to the left as shown in FIG. 2 or by forcing the treadle portion downwardly by action of one's feet, a mechanical advantage is arrived at which enables the gross amount of force necessary to drag the basket in the desired manner to be reduced. Thus, the shellfisher may not only operate the rake in a less awkward position but further accomplish such with a lower degree of brute force; both decided advantages to both skilled and novice shellfisher alike.

Also by changing the position at which the clamp 36 is affixed to the upright member 32 via one of the several pins or openings 34, the angle of the handle 14 with regard to the bolt 12 is modified; and thus the angle of attack in which the basket 10 moves; i.e., rakes, across the shellfish bed is also modified. Obviously, this angular relationship may also be modified by extending or shortening the effective length of the handle 14—both parameters being useful to arrive at the desired angle at which the basket is drawn across the shellfish bed. Such angle is arrived at through experimentation or prior experience. Generally, it is advantageous to mount the upright member to one side of the boat so the operator has more room to manipulate such. Also such position avoids contact between the pole and the near side boat gunnel 20. In addition, the support 18 may be provided with means to receive the upright member 32 in other positions; i.e., on the opposite side thereof and adjacent the left side of the boat as pictured.

Turning now to FIGS. 3 through 7 of the drawing in particular, the construction of the basket 10 is best shown. Therein it can be seen that the basket is primarily formed by a plurality of adjacent laterally spaced tines 42 each of a generally U-shaped configuration and coming to a point 44 at their forward ends. Accordingly, the tines are adapted to drag into the soil of the shellfish bed in such a manner so as to permit mud and soil to move through the spaces provided between the tines 42 yet capture the shellfish such as clams and the like therein. For such purpose the basket includes an upper open end which assumes a forward position in the dragging position as shown in FIG. 1. A plurality of cross bars 46 are provided at the lateral edges of the outer most tines 42 in order to complete the substantial enclosure form of the basket 10.

The tines 42 are joined together by a bar or plate 48 extending laterally across the rear upper edges thereof to which the tines are secured by welding or other known mechanisms. A bar 50 extends across several of the centrally positioned tines 42 and is downwardly spaced from the plate 48 so as to form a forwardly open pocket 52. The lower end of handle or pole 14 is provided with a flange 54 fixedly attached thereto and is adapted to be received in such pocket 52. In this manner the opposed upper and lower edges of the flange 54 may engage the prospective upper and lower edge surfaces of the bar 50 and the plate 48 when they are aligned such that rotation of the handle 14 may serve to similarly rotate the basket 10. Such action is desirable when the basket is clogged with mud or stones and is desired to turn the basket upside-down so that such material may be discharged from the open top or forward opening thereof.

It should also be apparent that the plate 50 includes a stop member 55 generally parallel to and forwardly spaced therefrom by means of a connecting element 56. The stop member and the plate 50 thus form a secondary pocket 57 into which the flange 54 may extend as will be brought out. The stop member 55 upwardly terminates generally in line with the lower edge of the pocket 52 such that the basket may move along the pole 14 without interference as when the pole flange 54 is aligned with the pocket 52 as shown in FIG. 4; that is, when the flange is disposed horizontally. By rotating the pole 90° when the flange 54 thereof is positioned adjacent the pocket 52, one side of the flange will move into the secondary pocket 57 behind the stop member 55 and in front of the plate 50. In such position the flange enables the basket to be both pushed and pulled by application of such forces on the pole 14; that is, the flange abuts the stop when the pole is pushed and the plate when it is pulled. Full rotation of the flange is prevented by a tab 58 inwardly extending from the stop 55.

A line 60; i.e., rope, cord, or the like, extends from the upper part of the handle 14 therealong and is attached to the basket in a manner that will hereinafter be more fully explained such that by pulling on the line 60, the basket may be upwardly moved to the surface while using the stationary held pole 14 as a guide. In this regard, the heel or rearward portion of the basket may be provided with a sleeve 62 rearwardly extending from the pocket area 52. The handle 14 is adapted to be received in such sleeve which may further include an eyelet 64 for the line 60.

A cover 66 is mounted on the plate 48 by means of a spring hinge 68. The hinge continually urges the cover to the open position as shown in FIG. 3. The forward face of the cover 66 is provided with a forwardly extending bent arm 69 of a thickness slightly less than the spacing of the spacing between adjacent tines 42 and so positioned with regard to the tines located therebeneath that the arm 69 may extend therebetween so as to project to the rear of the heel of the basket when the cover 66 is swung to a closed position. The forward end of the arm 69 includes an extension 70 in which an opening is formed and through which the line 60 may be attached after passing through the interior portion of the basket 10. Accordingly when the line 60 is upwardly drawn, such action serves to initially pivotally move the cover 66 in a closed position where it rests upon the pointed ends 44 of the tines 42 so as to substantially enclose the basket. Further drawing of the line serves to draw the basket up along the handle 14 assuming, of course, that the flange 54 is aligned with the pocket 52 in its open or free position as shown in FIG. 3. In such regard, the sleeve 62 aids in stabilizing the upward motion of the basket along the handle 14; and although the basket may to some extent tend to revolve about the handle, there is no danger of losing the shellfish catch since the basket is substantially closed by the action of the cover 66 being urged across the open front face of the basket by reason of the continual force applied to the line 60.

As operation of the device of the present invention may take place in relatively deep water; that is, 30 to 40 feet and at times up to 100 feet, it is necessary for practical considerations to operate with a multi-piece or sectional pole. Accordingly, the pole 14 includes a primary section 72 on which the flange 54 is attached as by welding at the foot thereof. The primary section 72 is normally about 20 feet in length. Secondary sections 74 which may be for instance in 10 foot sections are adapted to be attached to the primary section and to each other such that the necessary pole length can be built up by the operator while in the boat. Also, inasmuch as the basket 10 is adapted to slide over the outside surface of such sections 72 and 74, it is essential that such outer surfaces be free from obstacles which would prevent or interfere with such movement.

Figure 8:
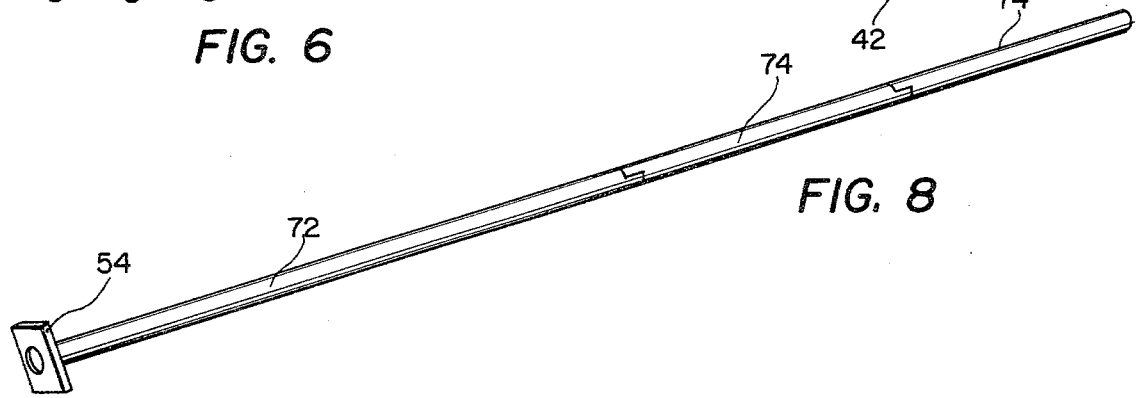
FIG. 8 is a perspective view illustrating a preferred construction of the pole or handle which supports the basket.
Figure 9:
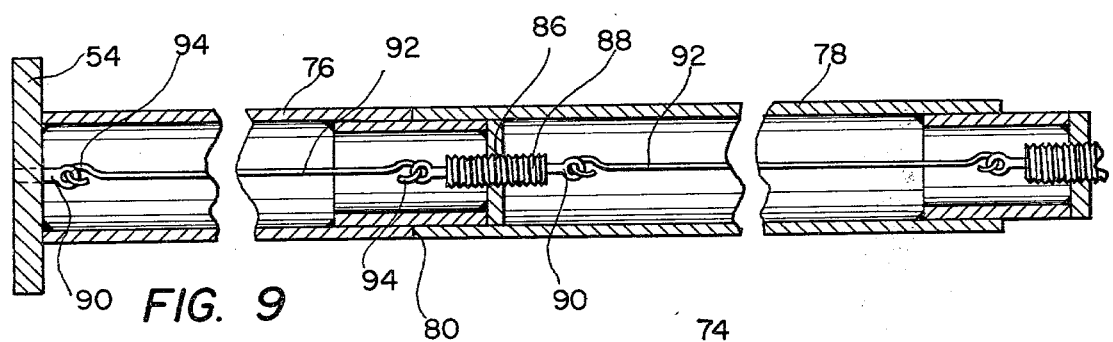
FIG. 9 is a sectional view illustrating the manner in which the pole sections are internally interconnected.
Figure 10:
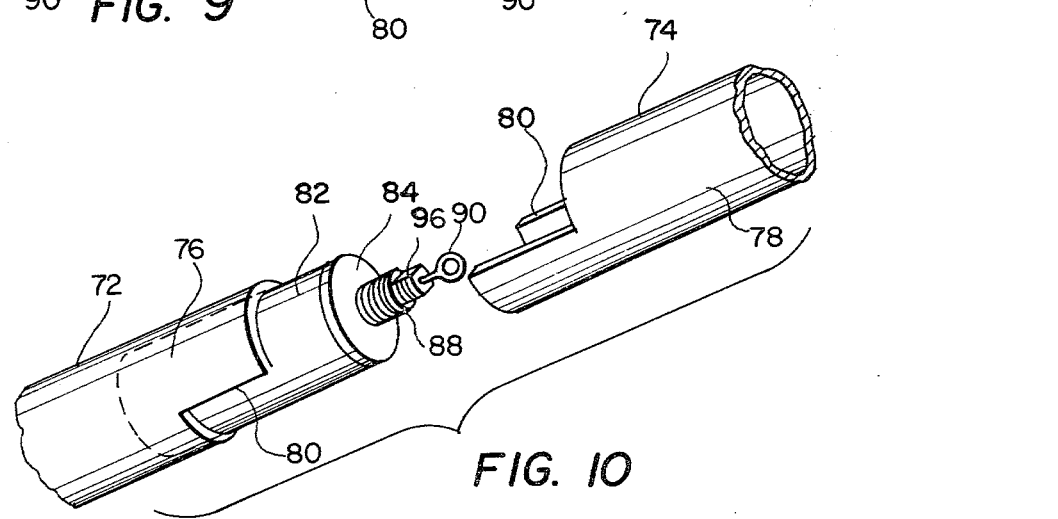
FIG. 10 is a perspective view further showing such interconnection.

In this regard, the primary and secondary sections include a tubular body 76 and 78 respectively. The outer end of the primary section and each end of the secondary sections include a 180° cutaway step 80 such that the steps 80 of adjacent ends are adapted to interfit with each other as shown in FIGS. 8–10 such that relative rotation of connected sections is prevented. Also, the outer ends of the sections 72 and 74 include a reduced diameter extension 82 which outwardly extends therefrom and is adapted to extend into the inner end of an adjacent section. The extensions 82 may be welded or otherwise connected to the interior surface of the section to which it is associated. Each extension includes a closed outer end or cap 84. The cap in turn is provided with a centrally disposed threaded bore 86 into which a threaded plug 88 is disposed. Each end of the plug includes an eyelet 90. The flange 54 also includes an eyelet 90 which extends into the primary section at the foot thereof.

A wire or cable 92 terminating at opposite ends in a hook 94 adapted to extend the length of each connected section such that the hooks 94 connect with the eyelets 90 and are tensioned therebetween by rotation of the plug 88 as by a wrench. The plug 88 is provided with a square head 96 for such purpose. Thus, the tension applied to the wires or cables 92 serves to hold the sections 72 and 74 together in the desired manner without presenting any outer surface projections which could interfere with the slide of the basket 10 thereover. For this purpose one or both of the above-described eyelets 90 is adapted to swivel.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. An improved rake for shellfish and the like comprising a basket in part formed from a plurality of laterally spaced generally U-shaped tines defining a rear heel and a normally open face to said basket, forward portions of said tines adapted to contact the bed of the ocean or other body of water in operating position, a plate extending laterally across the rear of said basket so as to interconnect rear portions of said tines, guide means disposed at the rear of said basket for slidably receiving an elongated handle adapted to extend through the surface of said body of water downwardly to said basket while its upper end remains above said surface, said handle terminating at its lower end in a stop adapted to engage said basket guide means in a first position thereof such that upward movement on said handle will drag said basket along said bed, and downward movement on said handle will push said basket along said bed, said basket freely slidably movable along said handle for substantially the entire extent thereof when said stop is positioned relative to said guide means in an alternate second position, and a line attached to said basket and adapted to extend upwardly along said handle such that said basket may be slidably drawn to the water surface along said handle while the handle remains positioned in the water as above described.

2. The rake construction of claim 1 including a cover hingedly connected to said basket plate, said cover normally spring biased to an open position, said line connected to said cover and adapted to move said cover to a closed position across said normally open basket face.

3. The rake construction of claim 2, said cover including an arm member fixed thereto and extending forwardly therefrom to a terminal end to which said line is attached, said arm of a lateral width and so positioned so as to pivotally move between and to the rear of a pair of adjacent tines when said cover is pulled to its closed position by said line.

4. The rake construction of claim 1, said handle lower end stop being a flange of geometric shape having a plurality of edge surfaces and adapted to engage said guide means in face to face contact when said basket and handle are disposed in said first normal dredging position and in an alternate second position where said flange is adapted to be in edge to edge contact with said guide means such that partial rotation of said handle in said alternate position will rotate said basket.

5. The rake construction of claim 4, said guide means including a pocket opening through the rear heel thereof and through which said flange may move, said guide means further including a stop member spaced from said heel and extending into said basket so as to form a secondary pocket, said flange adapted for 90° rotation behind said stop into said secondary pocket so as to contact said stop member in face to face contact when said handle is pushed and to contact said heel when said handle is pulled.

6. The rake construction of claim 5, said stop including an inwardly extending finger adapted to limit said flange rotation within said secondary pocket.

7. In combination with the rake construction of claim 1, a frame adapted for support by a boat or the like on the surface of said body of water, said frame including a cross member pivotally supporting an upright member upwardly extending therefrom and in turn adapted to support and fixedly engage the upper end of said pole, said upright member movable from a first forward position proximate that side of the boat from which the pole extends to a second rearward position about said pivotal connection whereby said basket is dragged towards said boat by said movement.

8. The construction of claim 7, wherein said upright member includes a lower portion extending below said cross member to a point proximate to but spaced from the bottom of said boat, said lower portions including a foot treadle whereby one's foot may be used to pivotally move said upright member between said first and second positions.

9. The rake construction of claim 1, said pole including a plurality of tubular sections adapted to be interfitted together, and wherein adjacent ends of adjacent sections include means to prevent relative rotation of said sections and further including means disposed entirely inside each section for tensioning said sections together.

10. The rake construction of claim 9, said tensioning means including an extension projecting out of the open end of one tubular section and adapted to extend into the open end of an adjacent section, said extension terminating in a cap in turn provided with a rotatable plug, said plug including a hook member at opposite ends thereof such that a cable may be attached from the hooks of oppositely positioned plugs and whereby rotation of one of said plugs will place said cable under tension so as to draw said adjacent pole sections together.

* * * * *